March 19, 1940.    W. G. HILLEN ET AL    2,193,923
AIR CONDITIONING CONTROL SYSTEM
Filed July 16, 1935
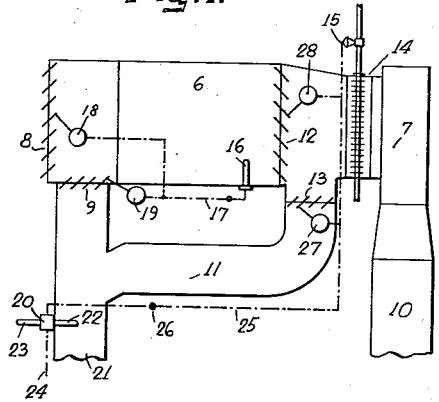
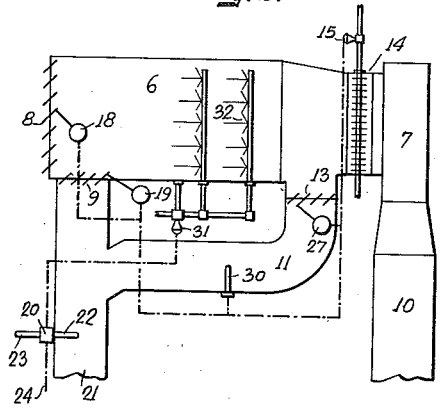
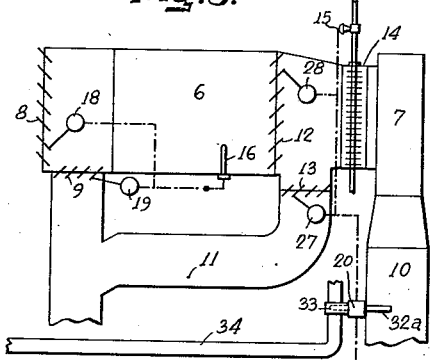
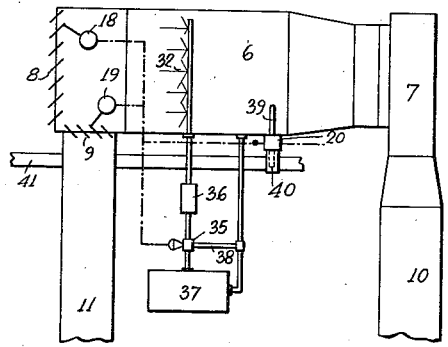
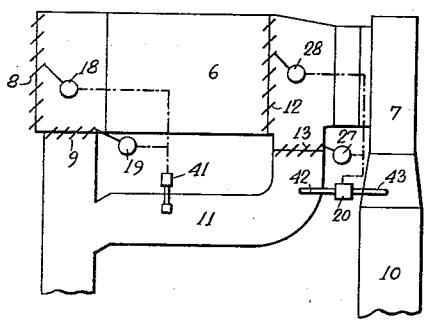
Inventors.
William G. Hillen, And
Fred. W. Bailey, Deceased,
By Edith Stackus Bailey, Ad.trix.
BY  Herman Seid
ATTORNEYS.

Patented Mar. 19, 1940

2,193,923

UNITED STATES PATENT OFFICE 2,193,923

AIR CONDITIONING CONTROL SYSTEM

William G. Hillen, Tokyo, Japan, and Frederic W. Bailey, deceased, late of East Orange, N. J., by Edith Stackus Bailey, administratrix, Skaneateles, N. Y., assignors, by mesne assignments, to Carrier Corporation, Newark, N. J., a corporation of Delaware Application July 16, 1935, Serial No. 31,710

2 Claims. (Cl. 236—91)

This invention relates to methods of controlling air conditioning systems and is a continuation in part of applicants' Patent No. 2,021,727, issued November 19, 1935. The substance of this application and the methods of operation herein covered, were disclosed in said patent.

The general object of the invention is to provide methods of controlling atmospheric conditions in enclosures adapted to accommodate persons wherein load conditions affecting the enclosure vary widely and in unpredictable manner. In places such as theatres, assembly halls, business rooms, railroad cars, and other enclosures suitable for human occupancy, wherein varying numbers of people congregate at different times, the load factor due to the people is a varying element, whose fluctuations follow no definite curve. In addition to this load factor, arising from the presence of human beings, there are other inside load factors, such as heat given off by lights, motors, working machinery, open vats, etc., etc. Also, such enclosures are affected by outdoor conditions. Thus, heat and humidity load factors, due to transmission and infiltration also vary widely in unpredictable fashion, and this adds to the problem of producing and maintaining desired conditions of comfort in the enclosure. The varying load factors are not alone responsible for the problem of control, because human tastes and requirements often dictate conditions to be maintained in an enclosure, and these conditions are not at all times the same, nor should they be, if desired atmospheric standards of comfort are to be met. Thus, a temperature and relative humidity suitable under summer conditions would not be suitable in the winter time, nor in intermediate seasons. Also, during the same season, the indoor condition would not at all times be comfortable if maintained constant, because outdoor conditions naturally vary as to temperature and humidity; and it is highly desirable that the indoor condition change in response to such variations.

Another object of the invention, therefore, is to provide a system of control for use with an air conditioning system, which will compensate for varying indoor load factors and for varying outdoor load factors, and which will corelate indoor and outdoor conditions so that indoor conditions will vary with outdoor conditions.

The variation of indoor conditions in response to changes in outdoor conditions cannot satisfactorily be carried out, unless the differential between the indoor and outdoor conditions also varies. Thus, it may be satisfactory for example, to have a 10 degree difference between indoor and outdoor dry bulb temperatures, under certain conditions, but, under others, such a differential may be inadequate, and a greater differential required.

A further object, therefore, is to provide a system of control which will not only compensate for varying indoor and outdoor temperature and humidity load factors, but which will produce a constant differential between indoor and outdoor conditions at certain times, and a varying differential between indoor and outdoor conditions at other times.

Another object is to provide a system of control for use not only in systems of air conditioning for human comfort, but also in systems for conditioning the atmospheres of enclosures for industrial purposes in which the temperature in one space will be controlled with respect to conditions in another space, or with respect to conditions outdoors. Thus, by use of this invention, any desired relationship may be maintained between two areas, as, for example, a room in a textile mill, and the atmosphere outdoors; or, for example, conditions in a compartment of a dryer with respect to conditions in a space to which material is conveyed from the dryer. Thus, rate of cooling or conditioning of materials may be controled by regulating differences in temperature conditions between different areas.

Another object of the inventtion is to provide a system of control in which relationship between dry bulb temperature or other characteristic of air in one area and wet bulb or other characteristic of air in another area is utilized to govern the condition of air delivered to an enclosure. Thus, the difference between outdoor dry bulb and indoor wet bulb may be utilized to govern the condition of air delivered to an enclosure under winter conditions, for example, in order to avoid condensation on walls, and yet effect humidification to as beneficial a degree as possible.

A feature of the invention covers the use of a single element control instrument responsive to conditions in a dehumidifier for regulating the action of outdoor air and return air dampers serving a dehumidifier, and the provision of a multi-element control instrument, operative responsive to differences in outdoor and indoor conditions, for proportioning volumes of return air and dehumidified air fed to an enclosure.

Another feature covers the use of a dry bulb or similar instrument, operative responsive to variations in atmospheric conditions in an enclosure, for regulating volumes of outdoor air and return air entering a dehumidifier and return air bypassing a dehumidifier; and a differential control operative responsive to variations in indoor and outdoor conditions for governing the dehumidifying effect within a conditioner.

Another feature covers the use of a dewpoint control or the like, operative responsive to conditions in a dehumidifier, for regulating the entrance of outdoor and return air to a conditioner; and a differential control operative responsive to variations in outdoor conditions and in conditions of air delivered to an enclosure for proportioning volumes of dehumidified and return air fed to said enclosure under summer conditions, and for operating a reheater under winter conditions.

Another feature covers the use of a differential control operative responsive to variations in outdoor air conditions with respect to conditions within a dehumidifier for varying the dehumidifying effect on air passing through the dehumidifier and for controlling volumes of outdoor and return air entering said dehumidifier.

Another feature covers the use of a hygrostat or similar instrument operative responsive to conditions in an enclosure for proportioning volumes of outdoor and return air entering a conditioner; and a differential control operative responsive to conditions within an enclosure with respect to condition of air supplied to the enclosure for proportioning volumes of dehumidified and return air supplied to the enclosure.

Other objects and features, illustrative of the wide variety of applications of this invention in air conditioning for human comfort, and for industrial purposes, will be more apparent from the following description of typical forms of the invention to be read in connection with the accompanying drawing, in which:

Fig. 1 diagrammatically illustrates an air conditioning system in which volumes of dehumidified and return air are controlled responsive to differential between conditions indoors and outdoors;

Fig. 2 diagrammatically illustrates a system in which degree of conditioning of air passing through a conditioner is regulated responsive to differential between indoor and outdoor conditions;

Fig. 3 is a diagrammatic illustration of a system in which volumes of conditioned and return air are proportioned responsive to differential in condition between outdoor air and air supplied to an enclosure;

Fig. 4 diagrammatically illustrates a system in which the temperature within a conditioner and volumes of outdoor and return air are controlled responsive to differential between temperatures outdoors and in a conditioner; and Fig. 5 represents diagrammatically a system in which volumes of conditioned air and return air are proportioned responsive to differential between temperature of return air and of air supplied to an enclosure.

Considering the drawing, similar designations referring to similar parts, number 6 designates an air conditioner which may contain cooling coils and/or banks of sprays through which air passes to be heated, cooled, humidified, dehumidified and cleaned, as is well known in the air conditioning art. Fan 7 draws a combination of outdoor and return air through dampers 8 and 9 respectively, through the conditioner, and delivers all air handled by it to an enclosure through supply duct 10. A volume of return air may bypass the conditioner through duct 11 to augment and attemperate the air leaving the conditioner, the conditioned air and bypassed air being controlled by dampers 12 and 13 respectively. A reheater 14 supplies heat, under winter operating conditions, under control of valve 15. Thermostat 16, located in the conditioner, reflects changes in temperature in the conditioner and varies the air pressure fed from any desired source through line 17 to diaphragm motors 18 and 19, which control outdoor air and return air dampers 8 and 9 respectively. Thus, under summer conditions, when outdoor wet bulbs are normally high, thermostat 16, upon a rise in dewpoint in the conditioner, will cause damper 8 to tend to close and 9 to tend to open. Conversely, if the dewpoint dropped below a predetermined temperature, the dampers 8 would open more widely and 9 correspondingly close.

Differential thermostat 20 is mounted on the return air duct 21 with thermal tube 22 subjected to the temperature of return air and tube 23 subjected to the temperature of outdoor air. Line 24 is a line feeding compressed air to thermostat 20 and line 25, having a "leak" device 26 therein, connects the discharge passage of the thermostat to air motor 27, which operates bypass damper 13, to air motor 28 which operates conditioner dampers 12, and to the diaphragm valve 15.

The instrument 20 is of the type shown in Fig. 1 of applicant's Patent No. 2,021,727 issued November 19, 1935. The valve 15 will be fully closed when the air pressure is 5 pounds or over. Thus, under summer conditions, no steam will be fed to the reheater. Bypass dampers 13 are normally open, but upon a rise in pressure above 5 pounds, the dampers will start to close and close a maximum amount when the air pressure reaches say 10 pounds per square inch. Motor 28 operates dampers 12 conversely, that is, the dampers are open a predetermined minimum amount when the air pressure is below, say, 5 pounds and will be fully open when the pressure reached, say, 10 pounds.

The instrument 20 is designed to control the proportions of conditioned air and bypassed air, as shown, for example, in the curve of Fig. 2, in said copending application, which describes instrument 20. Thus, the proportions of conditioned and bypassed air will be so controlled that a constant temperature will be produced and maintained within the enclosure until the temperature outside rises above a predetermined point. Then, the temperature in the enclosure will be increased as the outside temperature increases. As a result, the danger of "shock" to human beings will be greatly minimized, as otherwise often happens when the outside temperature is at a high or at too great a differential with respect to a maintained constant indoor temperature. However, thermal tube 22 expands to a greater extent per degree rise in temperature than does tube 23. Hence, although tube 23 would expand to restrict the flow of compressed air, tube 22 expands to increase the flow, thereby giving a desired differential effect. Thus, for every three degrees of rise in outdoor temperature, the indoor temperature will rise one degree. By adjusting differential thermostat 20, the proportion of indoor rise with respect to outdoor rise, above a prescribed point, may assume any desired relationship and not necessarily three to one. In the curve of Fig. 2, of our copending application illustrating this operation, the indoor temperature rises one degree for each three degree of rise in outdoor temperature, above 70 degrees. On the other hand, when the outside temperature drops, the inside temperature will also drop, until the outside temperature reaches a predetermined point, say 70 degrees F. Then even though the outside temperature will continue to go down, the inside temperature will remain the same. This is also shown in Fig. 2 of our copending application.

In Fig. 2, substantially the same arrangement of parts is employed as in Fig. 1, except that the fresh air, return air and bypass dampers 8, 9 and 13 are controlled responsive to temperature conditions in the enclosure, as reflected by thermostat 30, in return duct 11; and the condition of the spray water is controlled by the action of three way valve 31, operative responsive to differential thermostat 20, which reflects differences between temperature conditions inside the enclosure and out of doors. Upon rising dry bulb temperature conditions in the enclosure, in the summer time, thermostat 30 will cause damper 8 to tend to close, damper 9 to tend to open and damper 13 to tend to close. Upon a falling dry bulb temperature indoors, the reverse will take place. Differential thermostat 20 will cause valve 31 to admit to the sprays 32 a greater proportion of refrigerated fluid with respect to recirculated fluid when the outdoor temperature rises above a predetermined point, say 70 degrees. Again, the resultant method of operation may be controlled responsive to the setting of thermostat 20 to produce a result as shown in the graph of Fig. 2 of our copending application, where indoor temperatures rise with outdoor temperatures, but to a different degree. Air passing through the conditioner will, therefore, be reduced in temperature not merely in accordance with requirements in the enclosure, but also with respect to the temperature relation had by the air in the enclosure to that outdoors.

In Fig. 3, the same general system of Figs. 1 and 2 is subjected to a differential control in which dry bulb thermostat 16, as in Fig. 1, controls the operation of outdoor and return air dampers 8 and 9, but differential thermostat 20 controls conditioner dampers 12 and bypass dampers 13, under summer conditions, and reheater 14, under winter conditions, responsive to the differential between outdoor and delivery temperatures. In this case, it is desired to lower the temperature of air supplied to an enclosure, as the temperature outside the enclosure rises above a predetermined minimum. Hence, element 32a, of thermostat 20, is placed in duct 10, where it will respond to changes in temperature of air supplied by fan 7. Element 33 is subjected to the influence of outside air supplied to the instrument through sampling tube 34. As the temperature in duct 10 rises, tube 32 responds by expanding. Also, as the outdoor air temperature rises, tube 33 expands. But the expansion of the two elements, as described in our copending application, does not take place at the same rate. Also, the expansion and contraction does not take place beyond prescribed limits. As a result, the instrument may be set to hold a constant temperature in duct 10, say 70 degrees F., until the outside temperature rises to 73 degrees F. As the outside temperature rises above 73 degrees F., the tube 33 expands to control the proportions of conditioned and bypassed air, so that with each 3 degree F. rise outside, the temperature of air delivered by fan 7 will be reduced 2 degrees F. The instrument may be adjusted to stop the action of tube 33 at any desired point. As a result of this method of operation, the delivery temperature may be reduced 2 degrees for each 3 degree rise in outside temperature, above a predetermined starting point.

Instead of reducing the delivered air temperature, as the outside temperature increases, it may be desired to maintain constant the delivered air temperature, regardless of rise in outdoor temperature above a predetermined degree. Therefore, the instrument may be adjusted to control dampers 12 and 13, so that the delivered air temperature will drop as the outdoor air temperature rises, but when the outdoor temperature attains 70 degrees F., for example, the delivered air temperature will remain at 70 even though the outdoor air temperature continues to rise. The graph showing such operation is illustrated in Fig. 6 of our copending application.

In Fig. 4, an adaptation of the control is shown applied to an air conditioning system in which no bypass is employed. In this arrangement, outdoor air damper 8 is normally open and return air damper 9 normally closed. Differential thermostat 20 controls dampers 8 and 9, and the action of mixing valve 35. The dewpoint temperature of air passing through the washer 6 is thereby controlled. The pump 36 is adapted to draw water from the sump of air washer 6, either through refrigerating machine 37, or through bypass 38, or through both, then delivering the liquid to the sprays 32. By control of valve 35, the amount of refrigerated water and recirculated water fed to the sprays is varied, whereby the temperature of the mixture is regulated. When air pressure on the diaphragm of three way valve 35 is below a predetermined value, say, 5 pounds per square inch, pump 36 draws its entire supply through bypass 38. As the pressure increases above 5 pounds, the valve operates to allow the pump to draw part of the water through the refrigerating machine and part through the bypass; and when the pressure reaches 10 pounds per square inch, the entire volume is drawn through the refrigerating machine. Thermostat 20 is mounted on the conditioner 6, so that element 39 responds to changes in temperature of the air in the conditioner. The other element 40 is influenced by changes in temperature of outside air through sampling tube 41. The instrument is of the type shown in Fig. 7 of our copending application, and controls the dewpoint of air passing through the conditioner in desired relation with respect to outdoor temperature. Assuming that the outside temperature is above 70 degrees, a rise in temperature in the conditioner will cause element 39 to expand, thereby increasing the air pressure on damper motors 18 and 19. This will tend to close outdoor air damper 8, and tend to open return air damper 9. If this is insufficient to bring the temperature in the conditioner down to the desired level, mixing valve 35 will function to allow the passage of water through the refrigerating machine. If, however, the temperature in the conditioner is below the desired point, say 70 degrees, element 39 will contract, thereby reducing the air pressure on the lines; and this will first act on valve 35 to reduce the amount of refrigerated water; and if the temperature still remains too low, damper 9 will start to close and 8 to open. Therefore, the dewpoint will remain constant even though the outdoor temperature imposes an increasingly added load, or varies, on an unpredictable schedule, above 70 degrees.

Under winter conditions, the refrigerating machine will be inoperative. The dewpoint should be reduced as the outside temperature falls, and this will be carried out by a contraction of tube 40 when the outside temperature falls below 70. Where the indoor load condition depends upon the human load in an enclosure, the refrigeration may be kept in service even under winter conditions and the dewpoint progressively lowered, as the outdoor air temperature falls, in order to avoid condensation on walls, etc.

In Fig. 5, another adaptation of the invention is shown. In this case, a hygrostat, or other similar instrument 41, operates responsive to changing relative humidity conditions in the enclosure, as reflected by return air passing through duct 11, and controls fresh and return air dampers 8 and 9. Differential thermostat 20 in this case responds to differences between temperature of returned air and temperature of delivered air. Under summer conditions, when the relative humidity of the return air rises above a predetermined percentage, instrument 41 will cause dampers 8 to tend to close and 9 to tend to open. Conversely, when the relative humidity in the enclosure drops below a predetermined percentage, return air dampers 9 will tend to close and outdoor dampers 8 tend to open. Bulb 42, of differential thermostat 20 responds to return air conditions, whereas 43 responds to temperature of the delivered air. As the temperature of return air rises, bulb 42 will expand, but the flow of compressed air to damper motors 27 and 28 will also be controlled by the reaction of bulb 43 to the condition of air delivered by fan 7. As a result, dampers 12 and 13 will operate to produce a final mixture delivered by fan 10 at a desired differential from the temperature in the enclosure, as indicated in duct 11. A delivered temperature will, therefore, be assured not so low with respect to the temperature in the enclosure as to produce shock to occupants. As in connection with Figs. 1-4, differential thermostat 20 may have its bulbs so adjusted with respect to one another, that the delivered temperature may be constant up to a certain point, and then vary with respect to variations in return air temperature, but at a different rate.

While the hygrostat is shown controlling dampers 8 and 9, it may also be used to control a three way valve, such as 35, in Fig. 4, of 31 in Fig. 2, for regulating the temperature of liquid fed to sprays or cooling coils in the conditioner. Under summer conditions, the hygrostat would then first close damper 8, except for a predetermined minimum, and open return air damper 9; and if this were insufficient, it would progressively lower the temperature of the conditioning liquid by regulating the three way valve, thereby effecting desired dewpoint control.

It is apparent, therefore, that in each of the systems described, control is effected responsive to temperature changes in two different air streams. As a result, differential control, or establishment of a fixed difference or varying difference between the condition of said air streams is brought about. Since differential control is not desirable under all conditions, the control of the systems is arranged to effect regulation responsive to conditions of one of the air streams only within certain limits. Thus, applicants provide differential thermostatic control under some conditions and straight thermostatic control under other conditions, in the same system. Further, the differential control is so arranged that the difference in condition between two air streams may be made to narrow or widen under some conditions and to remain constant under other conditions, in the same system.

It is to be observed that applicants' system effects control in accordance with differences in air temperatures, or, in other words, that the instrument compares the temperatures of two different air volumes and effects control in accordance with the differences disclosed by such comparison. In all forms of the invention the temperature of one volume of air is so regulated as to be at a desired temperature differential with respect to another volume of air. This other air, therefore, serves as a standard for comparison. For example, in Figs. 1 and 2, the temperature in the enclosure is maintained at a desired differential with respect to the outside air, and in such case the outside air constitutes a medium serving as a standard for comparison.

While typical systems have been illustrated, for carrying out the invention, it is apparent that many variations and adaptations are possible. For example, the system may be operated, if desired, responsive to differential between return air temperature and dewpoint in the dehumidifier, or between delivered temperature and dewpoint temperature, and in other ways. Also, the operating curves for winter operation, or for controlling industrial processes may require various modifications in operation, all of which should be considered within the purview hereof, as disclosed by the methods of operation covered herein, and utilizing regulating instruments of the character covered in our said copending application.

We claim:

1. The method of operating an air conditioning system for an enclosure which consists in drawing air from the outdoor atmosphere, withdrawing air from said enclosure, passing said outdoor air and at least a portion of said return air withdrawn from the enclosure in heat exchange relation with a conditioning medium, regulating the relative proportions of outdoor air and return air passed in heat exchange relation with said conditioning medium responsive to changes in the temperature of air which has been subjected to and affected by heat exchange with said conditioning medium, delivering to said enclosure said conditioned air and at least another portion of the return air withdrawn from said enclosure, and controlling the relative proportions of conditioned air and return air delivered to the enclosure responsive to differences in condition between air in the enclosure and outdoors.

2. The method of operating an air conditioning system for an enclosure which consists in drawing air from the outdoor atmosphere, withdrawing air from said enclosure, passing said outdoor air and at least a portion of said return air withdrawn from the enclosure in heat exchange relation with a conditioning medium, regulating the relative proportions of outdoor air and return air passed in heat exchange relation with said conditioning medium responsive to changes in a psychrometric characteristic of air which has been subjected to and affected by heat exchange with said conditioning medium, delivering to said enclosure said conditioned air and at least another portion of the return air withdrawn from said enclosure, and controlling the relative proportions of conditioned air and return air delivered to the enclosure responsive to differences in condition between air in the enclosure and outdoors.

WILLIAM G. HILLEN.
EDITH STACKUS BAILEY,
*Administratrix of the Estate of Frederic W. Bailey, Deceased.*